United States Patent Office 3,531,485
Patented Sept. 29, 1970

3,531,485
ARYL-SUBSTITUTED DIAZABICYCLOALKANES
Meier E. Freed, Philadelphia, Pa., assignor to American Home Products Corporation, New York, N.Y., a corporation of Delaware
No Drawing. Filed Aug. 14, 1967, Ser. No. 660,210
Int. Cl. C07d 51/72
U.S. Cl. 260—268    10 Claims

ABSTRACT OF THE DISCLOSURE

Aryl-substituted-diazabicycloalkane bases (I) are prepared, for example, by treating a 1-($\beta$-haloethyl- or $\gamma$-halopropyl) - 2-halomethyl or $\beta$-haloethylpyrrolidine or -piperidine with ammonia or a primary amine and, if desired, the bases are converted to acid-addition salts. Compounds (I), especially 3-aryl-1,4-diazabicyclo[4.3.0]nonanes (Ia) and their salts are useful as anticonvulsants, depressants and analgesics.

---

This invention relates to aryl-substituted diazobicycloalkanes, which exhibit anti-convulsant, depressant and analgesic activity in warm-blooded animals.

The compounds contemplated by this invention are a compound of Formula I:

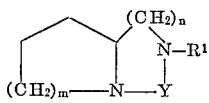

wherein $m$ and $n$ are 1 or 2;
Y is —$CH_2$—$CR_2$— or —$CH_2$—$CH_2$—$CR_2$—
  wherein
    R is hydrogen, phenyl, halophenyl, lower alkoxyphenyl or aminophenyl, at least one R being other than hydrogen; and
    $R^1$ is hydrogen,

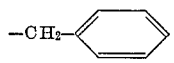

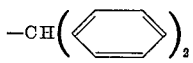

or

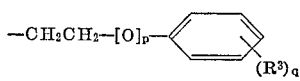

wherein
$p$ is 0 or 1 and
$q$ is 1 or 2 and
$R^3$ is hydrogen, halogen, trifluoromethyl, lower alkoxy or amino, or
a pharmaceutically-acceptable acid-addition salt thereof.

The bases of Formula I readily form pharmaceutically-acceptable acid addition salts with organic and inorganic acids such as hydrochloric acid, sulfuric acid, nitric acid, acetic acid, fumaric acid, citric acid and the like; such salts are within the scope of this invention. The term "lower alkoxy" when used herein and in the appended claims contemplates straight and branched chain groups containing from about 1 to about 6 carbon atoms. Illustrative of such groups are methoxy, ethoxy, i-propoxy, t-butoxy, n-hexyloxy, and the like. "Halogen" and its derivation "halo" contemplates chlorine, bromine, iodine and fluorine.

Compounds of Formula I thus embrace aryl-substituted-1,4-diazabicyclo[4.3.0]nonanes of Formula Ia:

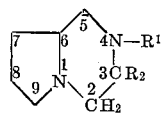

Ia and aryl-substituted - 1,4-diazabicyclo[4.4.0]decanes of Formula Ib:

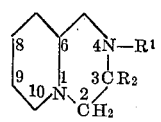

Ib wherein R and $R^1$ are as above defined, although the invention in its broadest aspects will include compounds in which the monoazacycloalkane ring contains from 5 to 6 members and the diazacycloalkane ring contains from 6 to 8 members. Especially useful are the compounds of Formula Ia.

Special mention is made of several species which are important embodiments of this invention:

The compound of Formula I (and Ia) which is 3-phenyl-4-phenylethyl-1,4-diazabicyclo[4.3.0]nonane, especially in the form of its hydrochloric acid addition salt;

The compound of Formula I (and Ia) which is 3-phenyl-4-benzyl-1,4-diazabicyclo[4.3.0]nonane, especially in the form of its hydrochloric acid addition salt;

The compound of Formula I (and Ia) which is 3-phenyl-4-(p-chlorophenylethyl) - 1,4 - diazabicyclo[4.3.0]nonane, especially in the form of an acid addition salt with hydrogen chloride;

The compound of Formula I (and Ia) which is 3-phenyl-4-(3,4-dimethoxyphenylethyl) - 1,4-diazabicyclo[4.3.0] nonane; and The compound of Formula I (and Ia) which is 3-phenyl-4-(m-chlorophenylethyl) - 1,4 - diazabicyclo[4.3.0]nonane, especially in the form of an acid addition salt with hydrogen chloride.

The compounds of Formula I herein can be prepared by a number of different pathways. For example, once the appropriate compound wherein $R^1$ is hydrogen has been obtained (by means to be outlined hereinafter), Formula Ic:

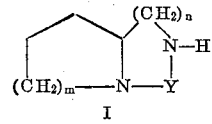

I wherein Y, $m$ and $n$ are as above defined, the hydrogen can be replaced by reaction with a alkylating agent such as $R^1X$ wherein $R^1$ is benzyl, benzhydryl, phenylethyl, or substituted phenylethyl or phenoxyethyl or substituted phenoxyethyl and X is a displaceable group such as halogen, e.g., chlorine or bromine, or the p-toluenesulfonate group or an obvious chemical equivalent thereof, to obtain the desired compound.

Furthermore, the instant compounds, including those of Formula Ic are provided by treating ammonia or a primary amine with a dialkylating agent (II) according to the following sequence:

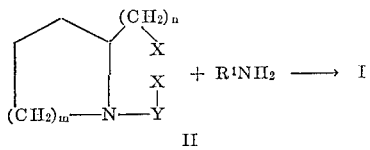

wherein X is a displaceable group such as halogen, e.g. chlorine or bromine, or the p-toluene sulfonate group or an obvious chemical equivalent thereof and $R^1$, $m$, $n$ and Y are as above defined in Formula I. According to one method a mixture of the compound of Formula II and ammonia or the primary amine in a suitable solvent, for example an oxygenated organic solvent, e.g., dimethoxyethane, is heated (in a pressure vessel if necessary) until ring closure is substantially complete (about 48 hours is more than adequate). If an excess of the amine is used this reacts with the displaceable anion and the amine salt in precipitated, assuming that a solvent like dimethoxyethane is used. The product can be recovered in a variety of ways. For example, the reaction mixture can be filtered, then evaporated, leaving the product base as a residue. This can be taken up in ether, and the solution washed and dried. Evaporation of the ether leaves the compound of Formula I as a residue. If further purification is desired, the base can be distilled in a high vacuum or, if it is a solid, it can be recrystallized from a suitable solvent, such as ether. The acid addition salts can be prepared by standard techniques: For example, the base of Formula I is dissolved in acetone, ethanol, ether and the like, then treated with a stoichiometric quantity of the appropriate acid either as a gas, for example, or dissolved in a solvent. Depending on the solvents used, the acid addition salts will either precipitate and are recovered by filtration, or the mixture is evaporated leaving the desired salt as a residue.

Other means can also be employed to obtain compounds of Formula I. For example, a diaminoester or amido amino ester (III) can be cyclized to a lactam (IV) which can be reduced to a compound equivalent thereof, according to the following pathways:

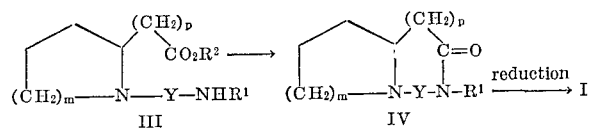

wherein $m$, Y and $R^1$ are as above defined, $p$ is 0 or 1 and $R^2$ is lower arkyl of up to about 6 carbon atoms or amino.

Of course, as will be obvious to those skilled in the art, the amide can be alkylated before reduction to the compound of Formula I.

One further means to prepare the valuable compounds of this invention is outlined in the following pathway:

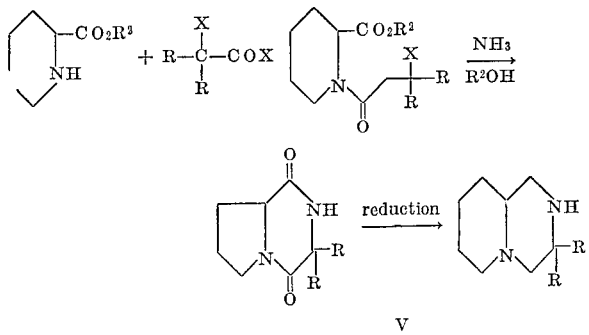

wherein R, $R^2$ and X are as defined hereinabove. This procedure, which will be exemplified in detail hereinafter, is especially useful to provide gem-diphenyl compounds, e.g., those disubstituted with phenyl groups on a single carbon. In some cases, it is possible to isolate a mono-keto compound by selective reduction of the diketone (V).

The compounds of Formula I possess valuable pharmacological properties. In particular, the new compounds are useful as anti-convulsants, depressants and analgesics, i.e., compounds which alleviate spasms or muscle contractions, depress abnormal bodily functional activity and relieve pain. Because of this, they are useful in experimental and comparative pharmacology.

When used for the purposes illustrated above, it may be desirable according to conventional pharmaceutical practice to combine the specific compound selected into compositions suitable for enteral or parenteral administration by formulation with a pharmaceutically acceptable organic or inorganic carrier. The composition may be prepared in solid form, such as tablets or in liquid form such as a solution, suspension or emulsion. Suitable liquid carriers include water, gelatin, lactose, starch, talc, vegetable oils, alcohols, polyalcohols, gums, syrups, and the like. The pharmaceutical composition in addition to the active principle and the carrier may include auxiliary materials such as coloring, stabilizing, wetting or emulsifying agents. It is, of course, to be understood that the carrier as well as any other materials present with the active principle to be inert with respect thereto.

The dosage of the present therapeutic agents will vary with the form of administration and the particular compound selected. Furthermore, the dosage will vary with the particular subject being treated. Generally, treatment is initiated with small dosages, substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general the compounds of this invention are most desirably administered at a concentration level that will generally afford effective results without causing any harmful or deleterious side effects and preferably at a level that is in the range of from about 1.5 mg./kg. to about 15 mg./kg. per day, although, as mentioned, variations will occur. However, a dosage level that is in the range of from about 4.5 mg./kg. to about 9 mg./kg. per day is most desirably employed to achieve effective results.

DESCRIPTION OF THE PREFERRED EMBODIMENTS

The following examples set forth the preparation of a number of the novel compounds of this invention. They are merely illustrative and are not to be construed as limiting the claims in any manner whatsoever.

EXAMPLE 1

3-phenyl-4-phenethyl-1,4-diazabicyclo-[4.3.0]nonane and hydrochloride

A mixture of 1-($\beta$-chloro-$\beta$-phenyl)ethyl-2-chloromethylpyrrolidine hydrochloride (5.89 g., 0.02 mole), $\beta$-phenethylamine (9.71 g., 0.08 mole) and dimethoxyethane (100 ml.) is refluxed for 12 hours. After cooling, the mixture is filtered to remove the phenethylamine hydrochloride (6.71 g.). The filtrate is concentrated. The residue is taken up in ether (400 ml.) and the resulting solution washed three times with saturated sodium chloride solution, then dried over anhydrous magnesium sulfate. After filtering, the solution is freed of the solvent and the residue distilled, collecting 2 g. of product boiling at 175–185° C. at 0.4 mm. This is dissolved in acetone (25 ml.) and converted to the hydrochloride with saturated ethanolic hydrogen chloride. Yield: 1.18 g. (15.5%) of hydrochloride melting at 268–272° C. (dec.).

*Analysis.*—Calcd. for $C_{21}H_{28}Cl_2N_2$ (percent): C, 66.50; H, 7.44; Cl, 18.68; N, 7.39. Found (percent): C, 66.63; H, 7.03; Cl, 18.94; N, 7.54.

$^{24}[\alpha]_D = -63$, 1.002% in 95% ethanol.

EXAMPLE 2

3-phenyl-4-benzyl-1,4-diazabicyclo[4.3.0]-nonane and hydrochloride

A mixture of 1 - ($\beta$ - chloro-$\beta$-phenyl)ethyl-$\alpha$-chloromethylpyrrolidine hydrochloride (10.0 g., 0.034 mole), benzylamine (14.58 g., 0.136 mole) and dimethoxyethane (100 ml.) is refluxed for 12 hours. The mixture is cooled and filtered to remove the benzylamine hydrochloride (9.3 g.). The filtrate is concentrated. The residue was taken up in 500 ml. of ether and the resulting solution washed with water (3 portions, 50 ml. each), then dried over anhydrous magnesium sulfate. After filtering, the solution is freed of solvent and distilled, collecting the fraction boiling at 155–185° C. at 0.5 mm. (2.0 g.). It is dissolved in ethanol (10 ml.) and converted to the hydrochloride with saturated ethanolic hydrogen chloride. Ether is added to induce crystallization. The resulting solid is recrystallized from ethanol-ether to give 0.68 g. (5.5%) of a solid melting at 224–225° C. (dec.).

*Analysis.*—Calcd. for $C_{20}H_{26}Cl_2N_2$ (percent): C, 65.78; H, 7.18; Cl, 19.41; N, 7.67. Found (percent): C, 65.89; H, 7.17; Cl, 19.35; N, 7.86.

$^{24}[\alpha]_D = -45$, 0.998% in 95% ethanol.

EXAMPLE 3

3-phenyl-4-(p-chlorophenethyl)-1,4-diazabicyclo-[4.3.0]nonane and hydrochloride

A mixture of 1-($\beta$ - chloro - $\beta$-phenyl)ethyl-$\alpha$-chloromethylpyrrolidine hydrochloride (10.0 g., 0.034 mole), p-chlorophenylethylamine (21.2 g., 0.136 mole) and dimethoxyethane (100 ml.) is refluxed for 12 hours. After cooling, the mixture is filtered to remove the p-chlorophenylethylamine hydrochloride (14.2 g.). The filtrate is concentrated. The residue is taken up in 300 ml. ether and washed with water (3 portions, 50 ml. each). The solution is dried over anhydrous magnesium sulfate. It is filtered, and freed of solvent. The residue is distilled, collecting the fraction boiling at 185° C. to 220° C. at 0.3 mm. (5.6 g.). The product is extracted with ether, filtering off some insoluble material. The ethereal extracts are treated with anhydrous hydrogen chloride. This is recrystallized from ethanol-ether to give the hemihydrate of the hydrochloride, 1.80 g. (12.5% yield) melting at 241–243° C.

*Analysis.*—Calcd. for $C_{21}H_{27}Cl_3N_2 \cdot \frac{1}{2}H_2O$ (percent): C, 59.65; H, 6.67; Cl, 25.15; N, 6.62. Found (percent): C, 60.01; H, 6.26; Cl, 25.53; N, 6.64.

$^{24}[\alpha]_D = -55$, 0.983% in 95% ethanol.

EXAMPLE 4

3-phenyl-4-(3,4-dimethoxyphenylethyl)-1,4-diazabicyclo[4.3.0]nonane

A mixture of 1 - ($\beta$ - chloro-$\beta$-phenylethyl)-$\alpha$-chloromethylpyrrolidine hydrochloride (10.0 g., 0.034 mole), $\beta$-3,4-dimethoxyphenylethylamine (24.63 g., 0.136 mole) and dimethoxyethane (100 ml.) is refluxed for 27½ hours. After cooling, the mixture is filtered to remove the dimethoxyphenylethylamine hydrochloride. The filtrate is concentrated. The residue is taken up in ether. The ether solution was washed with water (50 ml.), 10% sodium carbonate solution (2 portions, 50 ml. each) and saturated sodium chloride solution (3 portions, 50 ml. each). The solution is dried over anhydrous magnesium sulfate, filtered and freed of solvent. The residue is distilled, collecting the fraction boiling at 160° C. to 210° C. at 0.25 mm. (5.4 g.). This fraction is extracted with ether, filtering off the insoluble material. The ether is concentrated and the solid that is formed is triturated with a little ether and filtered. Recrystallization from ether yields the product, 1.57 g. (12.6% yield) melting at 93°–95° C.

EXAMPLE 5

Alcoholic solutions of 3-phenyl-4-phenethyl-1,4-diazabicyclo[4.3.0]nonane are treated respectively with stoichiometrically equivalent amounts of solutions in alcohol of the following acids: nitric, sulfuric, acetic, fumaric, and citric. The mixtures are lyophilized to leave as residues the respective nitric, sulfuric, acetic, fumaric and citric acid addition salts of 3-phenyl-4-phenethyl-1,4-diazabicyclo [4.3.0]nonane.

EXAMPLE 6

3-phenly-4-benzyl-1,4-diazabicyclo[4.3.0]-nonane (alternate procedure)

Benzylamine (4.5 ml., 0.0402 mole) is added to 1-($\beta$-chloro - $\beta$-phenyl)-ethyl-$\alpha$-chloromethylpyrrolidine hydrochloride (3.0 g., 0.0102 mole). An exotherm raises the temperature to 52° C. The mixture is placed in an oil bath heated to 120°. When the mixture reaches a temperature of 90°, an exotherm raises it to 155° C. The mixture is held in the bath for 5 minutes, then cooled. It is triturated several times with ether and the solid filtered off and dried, giving 3.46 g. benzylamine hydrochloride. The filtrate is freed of solvent and distilled, collecting the fraction boiling at 171–174° C. at 0.25 mm., 0.5 g. This material is converted to the hydrochloride by dissolving it in ethanol, treating with saturated ethanolic hydrogen chloride and initiating the precipitation with ether. Filtration yields the product, 0.22 g., 5.9% yield, melting at 223–225° C. (dec.).

EXAMPLE 7

3-phenyl-4-(m-chlorophenylethyl)-1,4-diazabicyclo [4.3.0]nonane and hydrochloride 1-($\beta$-chloro-$\beta$-phenyl)ethyl $\alpha$-chloromethyl pyrrolidine hydrochloride (10.0 g, 0.034 mole), m-chlorophenylethylamine (5.29 g., 0.034 mole), triethylamine (10.6 g., 0.105 mole) and dimethoxyethane (100 ml.) are combined and heated under reflux for 19 hours. The mixture is cooled and filtered to remove the triethylamine hydrochloride (7.64 g.). The filtrate is freed of solvent and the residue taken up in ether (300 ml.). The ethereal solution is washed with water (1 portion of 250 ml. and 3 portions, 150 ml. each) and dried over anhydrous magnesium sulfate. The dried solution is filtered, freed of solvent and the residue distilled, collecting the fraction boiling at about 210° C. at 0.35 mm., 3.6 g. This material is dissolved in hot isopropyl alcohol (15 ml.) treated with anhydrous hydrogen chloride and stored in the cold. The solid obtained on filtration is recrystallized from isopropyl alcohol to yield the dihydrochloride, 1.11 g., 7.9% yield and melting at 263–266° C. (dec.), $^{24}[\alpha]_D -54$, 1.009% in 95% ethanol.

*Analysis.*—Calcd. for $C_{21}H_{27}Cl_3N_2$ (percent): C, 60.96; H, 6.58; Cl, 25.72; N, 6.77. Found (percent): C, 60.63; H, 6.38; Cl, 25.96; N, 7.07.

EXAMPLE 8

3,3-diphenyl-1,4-diazabicyclo[4.3.0]decane (1) Ethyl - 1-($\alpha$-chloro-$\alpha$,$\alpha$-diphenyl)acetylpipecolate: To a solution of ethyl pipecolate (31.60 gms., 0.2 mole) in 300 ml. of dry methylenedichloride, cooled to 5° C., and stirred, is added dropwise a solution of 25 g. (0.095) mole) of $\alpha$-chloro-$\alpha$,$\alpha$-diphenylacetyl chloride in 100 ml. of dichloromethane. The reaction temperature is maintained below 10° C. during the addition. After stirring for 1 hour the ice bath is removed and the reaction mixture stirred for 2 hours at 25° C. The precipitate is filtered from the solution and washed with methylene dichloride, then with ether. The filtrate is concentrated under vacuum, the residue triturated with 100 ml. anhydrous ether. The product is filtered off, washed with ether, and dried: M.P. 110–112° C., 23 g., (62.7%). Concentration of filtrate affords a second crop, 7.2 grams (19.6%).

*Analysis.*—Calcd. for $C_{22}H_{24}ClO_3N$ (percent): C, 68.51; H, 6.28; N, 3.63; Cl, 9.19. Found (percent): C, 68.54; H, 6.22; N, 3.82; Cl, 9.15.

(2) 3,3-diphenyl-1,4-diazabicyclo[4.3.0]decane-2,5-dione: Ethyl 1-(α-chloro-α,α-diphenyl)acetypipecolinate (30 gms., 0.094 mole) is dissolved in 400 ml. of cold ethanol containing anhydrous ammonia (10% v./v.), and sealed in a bomb then heated on steam-bath 72 hours, then cooled. The mixture is filtered and the filtrate concentrated to 150 ml. Cooled, filtered off product. A second crop is obtained by further concentration. Combined yield: 8.5 grams, M.P., 221–223° C.

*Analysis.*—Calcd. for $C_{20}H_{20}N_2O_2$ (percent): C, 74.97; H, 6.29; N, 8.74. Found (percent): C, 74.37; H, 6.15; N, 8.57.

(3) 3,3-diphenyl-1,4-diazabicyclo[4.4.0]decan-5-one: To a suspension of lithium aluminum hydride, 3 g. in 150 ml. of dry tetrahydrofuran is added slowly, with stirring, a solution of 8.0 g. (0.025 mole) of 3,3-diphenyl-1,4-diazabicyclo[4.4.0]- decane in 100 ml. of the same solvent. The reaction is stirred and heated under reflux 12 hours. Cooling water, 10 ml. is added dropwise to decompose the hydride-complex. After stirring 1 hour the reaction mixture is filtered, the filter-cake washed with ether, then with isopropanol. The filtrate is taken to dryness under vacuum, the residue taken into ether and the basic product precipitated by the addition of dry hydrogen chloride. The product is filtered off, washed with ether and dried, then recrystallized from 2-propanol: M.P. 225°; yield: 5.5 grams. This material is dissolved in water and filtered clear. The filtrate is treated with 50% aqueous sodium hydroxide until strongly basic. The precipitate is filtered off, washed with water and dried, then recrystallized from petroleum ether. There is obtained 1.2 grams of 3,3-diphenyl-1,4-diazabicyclo[4.4.0]decan-5-one, M.P., 135° C.

*Analysis.*—Calcd. for $C_{20}H_{22}N_2O$ (percent): C, 78.40; H, 7.24; N, 9.14. Found (percent): C, 78.51; H, 7.50; N, 8.90.

(4) 3,3-diphenyl-1,4-diazabicyclo[4.3.0]decane: The product of step (3) is treated with lithium aluminum hydride according to the procedure of step (3) using dimethoxyethane as a diluent instead of tetrahydrofuran. The product is recovered by the procedure of step (3) and converted to the hydrochloric acid addition salt by the procedure of Example 6.

EXAMPLE 9

The procedure of Example 1 is repeated, substituting for the 1-(β-chloro-β-phenyl-2-chloromethylpyrrolidine, stoichiometrically-equivalent amounts of appropriately-aryl-substituted 1-(β-haloethyl or γ-halopropyl)-2-halomethyl or β-haloethylpyrrolidines or -piperidines and ammonia or an appropriately-substituted primary amine and the following aryl-substituted diazabicycloalkanes are obtained:

| m | n | Y | R¹ |
|---|---|---|----|
| 1 | 1 | —CH₂—CH—(phenyl) | H |
| 1 | 1 | —CH₂—CH—(phenyl) | —CH₂CH₂—(phenyl)—NH₂ |
| 1 | 1 | —CH₂—C(diphenyl)— | —CH₂CH₂—(phenyl) |
| 2 | 1 | —CH₂—CH—(phenyl) | —CH₂CH₂—(phenyl) |
| 1 | 2 | —CH₂—CH—(phenyl) | —CH₂CH₂—(phenyl) |
| 2 | 2 | —CH₂—CH—(phenyl) | —CH₂CH₂—(phenyl) |
| 1 | 1 | —CH₂—CH₂—CH—(phenyl) | —CH₂CH₂—(phenyl) |
| 1 | 1 | —CH₂—CH—(phenyl-OCH₃) | —CH₂CH₂—(phenyl) |
| 1 | 1 | —CH₂—CH—(phenyl-Cl) | —CH₂CH₂—(phenyl) |
| 1 | 1 | —CH₂—CH—(phenyl-F) | —CH₂—(phenyl) |
| 1 | 1 | —CH₂—CH—(phenyl-NH₂) | —CH₂CH₂—(phenyl) |

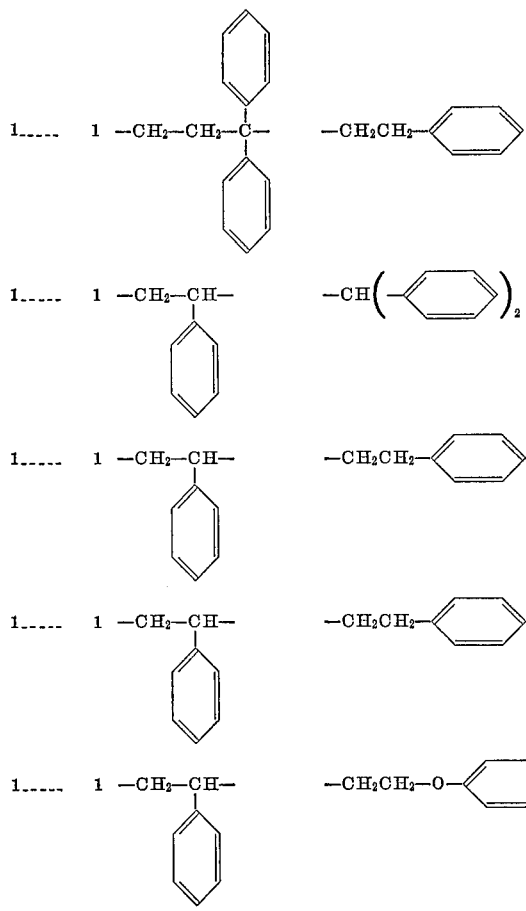

I claim:
1. A compound of the formula:

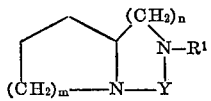

wherein
m is 1 or 2 and n is 1;
Y is —CH₂—CHR— wherein
R is phenyl, halophenyl, lower alkoxyphenyl or aminophenyl; and
R¹ is hydrogen,

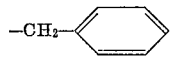

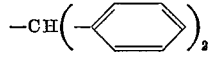

or

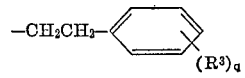

wherein q is 1 or 2 and R³ is hydrogen, halogen, trifluoro methyl, lower alkoxy or amino, or a pharmaceutically acceptable acid-addition salt thereof.

2. The compound as defined in claim 1, which is 3-phenyl-4-phenylethyl-1,4-diazabicyclo[4.3.0]nonane.

3. A compound as defined in claim 2 in the form of an acid di-addition salt with hydrogen chloride.

4. The compound as defined in claim 1, which is 3-phenyl-4-benzyl-1,4-diazabicyclo[4.3.0]nonane.

5. A compound as defined in claim 4 in the form of an acid di-addition salt with hydrogen chloride.

6. The compound as defined in claim 1, which is 3 - phenyl - 4 - (p-chlorophenylethyl) - 1,4 - diazabicyclo [4.3.0]nonane.

7. A compound as defined in claim 6 in the form of an acid di-addition salt with hydrogen chloride.

8. The compound as defined in claim 1, which is 3 - phenyl - 4 - (3,4-dimethoxyphenylethyl)-1,4-diazabicyclo[4.3.0]nonane.

9. The compound as defined in claim 1, which is 3 - phenyl - 4 - (m-chlorophenylethyl)-1,4-diazabicyclo [4.3.0]nonane.

10. A compound as defined in claim 9 in the form of an acid di-addition salt with hydrogen chloride.

References Cited
UNITED STATES PATENTS

| | | | |
|---|---|---|---|
| 2,999,091 | 9/1961 | Zaugg | 260—268 XR |
| 3,164,598 | 1/1965 | Freed | 260—268 |
| 3,176,017 | 3/1965 | Freed | 260—268 |
| 3,227,719 | 1/1966 | Hofmann et al. | 260—268 |
| 3,317,524 | 5/1967 | Freed | 424—250 |
| 3,388,128 | 6/1968 | Day et al. | 260—268 |
| 3,423,413 | 1/1969 | Priewe | 260—268 |

DONALD G. DAUS, Primary Examiner

U.S. Cl. X.R.
260—293, 293.4, 294.3, 326.8, 326.82; 424—250